Oct. 26, 1948.                   G. J. DOURTE                      2,452,110
              AUXILIARY SAFETY WHEELS FOR USE
                   ON AUTOMOBILES AND TRUCKS
Filed Aug. 27, 1945                                         3 Sheets-Sheet 1

George J. Dourte - INVENTOR.
BY Martin E Anderson
ATTORNEY.

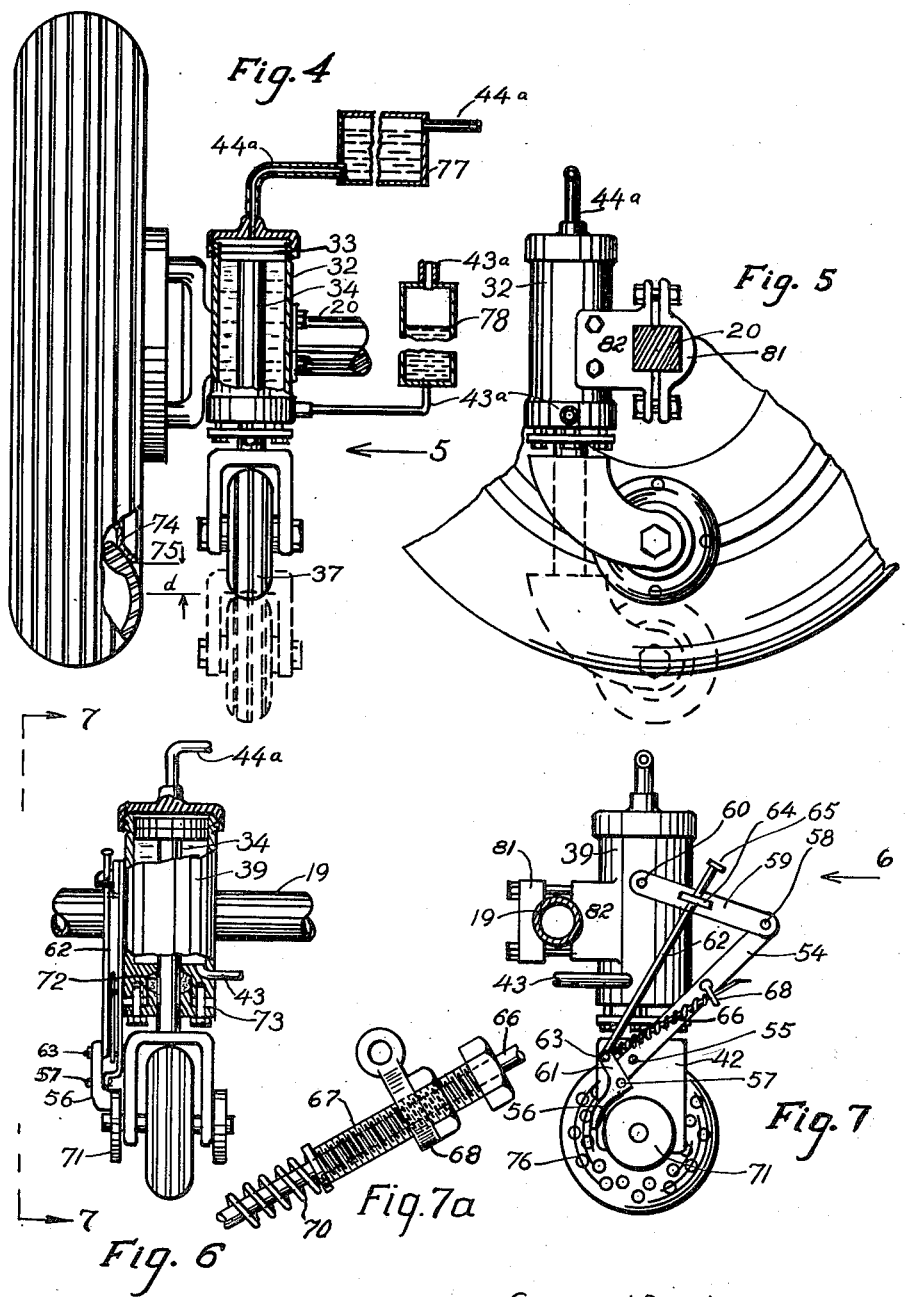

Oct. 26, 1948.　　　　　G. J. DOURTE　　　　　2,452,110
AUXILIARY SAFETY WHEELS FOR USE
ON AUTOMOBILES AND TRUCKS

Filed Aug. 27, 1945　　　　　　　　　　　3 Sheets-Sheet 3

George J. Dourte-INVENTOR.

BY Martin E. Anderson
ATTORNEY.

Patented Oct. 26, 1948

2,452,110

UNITED STATES PATENT OFFICE 2,452,110

AUXILIARY SAFETY WHEELS FOR USE ON AUTOMOBILES AND TRUCKS

George J. Dourte, Denver, Colo.

Application August 27, 1945, Serial No. 612,929

5 Claims. (Cl. 280—150)

This invention relates to improvements in safety devices for use on automobiles and trucks and has reference more particularly to a device designed to prevent skidding and which will also prevent serious accidents in case a blowout should occur while the vehicle is traveling and which, in addition, serves as a jack for lifting the wheels and axles during repairs.

Many accidents have occurred due to skidding of automobiles and trucks on slippery highways and in some instances such accidents have been serious and have resulted in personal injury and property damage.

Large punctures or blowouts cause a sudden deflation of the tires and when this occurs that part of the automobile will drop suddenly and if the machine is traveling at a high speed, very serious accidents may result.

In other instances slow punctures are formed which permit the tire to deflate so slowly that the operator does not become aware of this condition until the machine has been running for some time on the deflated tire, whereby the casing and the inner tube become damaged and frequently entirely ruined.

With automobiles and trucks, as they are constructed to-day, it is difficult to adjust an ordinary jack to the axle for the purpose of raising the axle and wheel for repair.

With the ordinary balloon tires, the rim is of small diameter and the rear axle at least is positioned quite a long distance from the rear end of the body and further still from the rear bumper, and therefore, when the rear end of a car is to be raised, specially constructed jacks are necessary for the operator finds it very difficult to raise the machine with an ordinary jack.

It is the object of this invention to equip an automobile with four hydraulic jacks permanently attached to the ends of the axles in position to lift that particular part of the automobile whenever this becomes necessary.

Another object of the invention is to produce a hydraulic jack attachment in which the cylinder portion thereof is attached to the axle adjacent a wheel, and the lower end of the plunger is provided with a wheel fork in which is rotatably mounted a rubber tired wheel which can be moved into engagement with the road surface by the application of air or hydraulic pressure.

A further object of the invention is to produce a safety device having rotatable wheels carried thereby for engagement with the pavement and which are controlled by a quick acting valve mechanism in such a way that the wheels may be quickly moved downwardly into engagement with the pavement whenever the operator notices any skidding.

A further object of the invention is to produce a safety device of the class referred to which can be operated independently of all of the others and that can be used for supporting the end of an axle in case the tire becomes ruined for any reason and which will therefore make it possible to transport the vehicle under its own power to a repair station in the absence of one or more tires.

A further object of the invention is to produce a nonskid safety device in which the rotating wheels that are brought into engagement with the pavement will be automatically acted upon by a brake mechanism at the time they engage the road pavement, to resist skidding and in which the brake mechanism will automatically release when the jack is fully extended, to permit transportation without the application of the brake.

A further object of the invention is to produce a safety device of the class mentioned which shall be of such construction that it will absorb sudden shocks that happen when a blowout occurs.

Having thus called attention to some of the objects of this invention and in a very general way explained the construction, the invention itself will now be described in detail, and for this purpose reference will be had to the accompanying drawings in which the invention has been illustrated in its preferred form, and in which:

Figure 4 is a front elevation looking in the direction of arrows 4 in Figures 1 and 2, showing one of the safety devices secured to the front axle, the inoperative position being shown in full lines and the fully extended position in dotted lines, a portion of the automobile tire casing being broken away to disclose the portion of the rim;

Figure 5 is a side elevation looking in the direction of arrow 5, in Figure 4;

Figure 6 is a rear elevation, partly broken away and shown in section looking in the direction of the arrow 6 in Figures 1 and 7 and shows one of the safety devices secured to the rear axle;

Figure 7 is a side elevation of the safety device looking through plane 7—7, in Figure 6;

Figure 7a is a detail to a somewhat enlarged scale;

Figure 1:
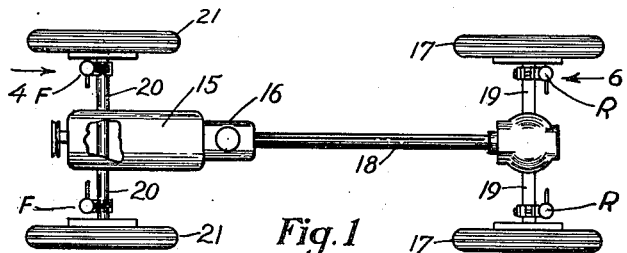
Figure 1 shows a portion of an automobile or truck chassis and shows the position of the several hydraulic jack mechanisms.

In the drawing reference numeral 15 designates an ordinary internal combustion engine and 16 the transmission gear housing from which power for driving the rear wheels 17 is transmitted by the torque shaft 18. The rear axle housings have been designated by reference numeral 19, the front axle has been designated by reference numeral 20, the front wheels by reference numeral 21. The safety devices secured to the front axle have been designated, in Figures 1, 2 and 3 by F and those secured to the rear axle by R.

Figure 2:
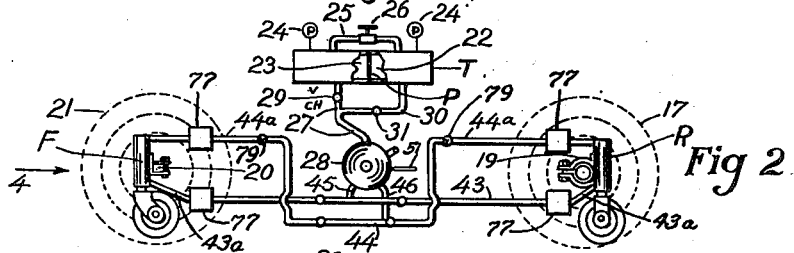
Figure 2 is a diagram showing the pipe connections between the pressure reservoirs and the hydraulic jacks on one side of the machine.

In Figure 2, the engine and torque shaft have been eliminated for clarity.

Figure 3:
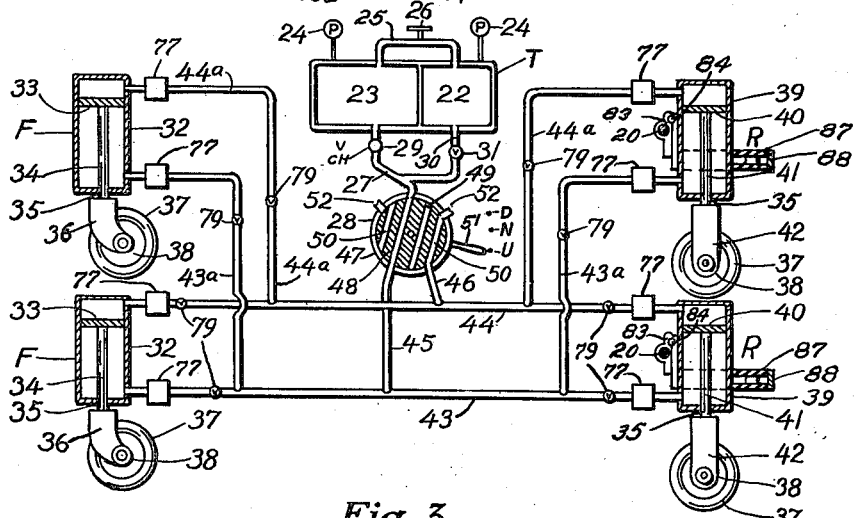
Figure 3 is a piping diagram similar to that shown in Figure 2, but to a larger scale and in which parts have been shown in section so as to more clearly disclose the construction and the relationship of the parts.

Carried by the automotive vehicle is a tank T which may have whatever capacity is found necessary and which is divided into two compartments by means of a transverse partition P. The compartment to the right of the partition, Figure 2, serves as a storage compartment for high pressure air and has been identified by reference numeral 22. The compartment to the left of the partition serves as a storage compartment for air of lower pressure and has been designated by reference numeral 23. The pressure gauges 24 may be connected with the compartments if desired. The two compartments are interconnected by means of a pipe 25 which has a valve 26 that controls the communication between them. By opening valve 26, high pressure air will flow into compartment 23 and bring the pressure in that compartment to the value desired. A pipe 27 connects the interior of compartment 23 with a control valve 28, which will hereinafter be described, and which has been shown in section in Figure 9. A check valve 29 is positioned in pipe 27 adjacent tank T. A pipe 30 connects the interior of high pressure tank 22 with pipe 27, between the control valve and the check valve, as shown in Figures 2 and 3. This pipe is provided with a valve 31 that is normally closed.

Referring now more particularly to Figure 3, where the several jacks have been shown in a more or less diagrammatic manner, reference numerals 32 designate the cylinders of the jacks secured to the front axle. Each front axle cylinder is provided with a piston 33 from which a plunger or piston rod 34 extends downwardly through the lower end of the cylinder. The rear axle cylinders have pistons 40 and piston rods 41. Stuffing boxes 35 are provided for the piston rods in the lower cylinder heads. The stuffing boxes have been shown in greater detail in Figures 4 to 7. A curved wheel fork 36 is secured to the lower end of each front axle piston rod and carries a wheel having a heavy solid rubber tire 37 mounted on a metal hub 38.

The rear jacks have cylinders 39 and pistons 40. The piston rods 41 connect with wheel forks 42. It will be observed that wheel forks 36 are rearwardly curved so as to form casters, whereas wheel forks 42 extend straight downwardly. The construction of the cylinder, pistons and wheels is shown in greater detail in Figures 4 to 7 to which reference will be hereinafter made.

Referring now to Figures 2 and 3 it will be observed that pipes 43 connect the interiors of cylinders 32 and 39 below the pistons 33 and 40, and pipes 44 the upper ends of the front and rear cylinders. Branch pipes 43a and 44a connect pipes 43 and 44 respectively with the lower and upper portions of the cylinders at opposite ends of the axles. Pipes 45 and 46 connect pipes 43 and 44 respectively with the control valve 28. The control valve has been shown more or less diagrammatically and consists of a cylindrical housing 47 in which a rotor 48 is mounted for oscillatory movement. The construction of the control valve is shown most clearly in Figure 9, to which reference will now be had.

Figures 8, 9, 10:
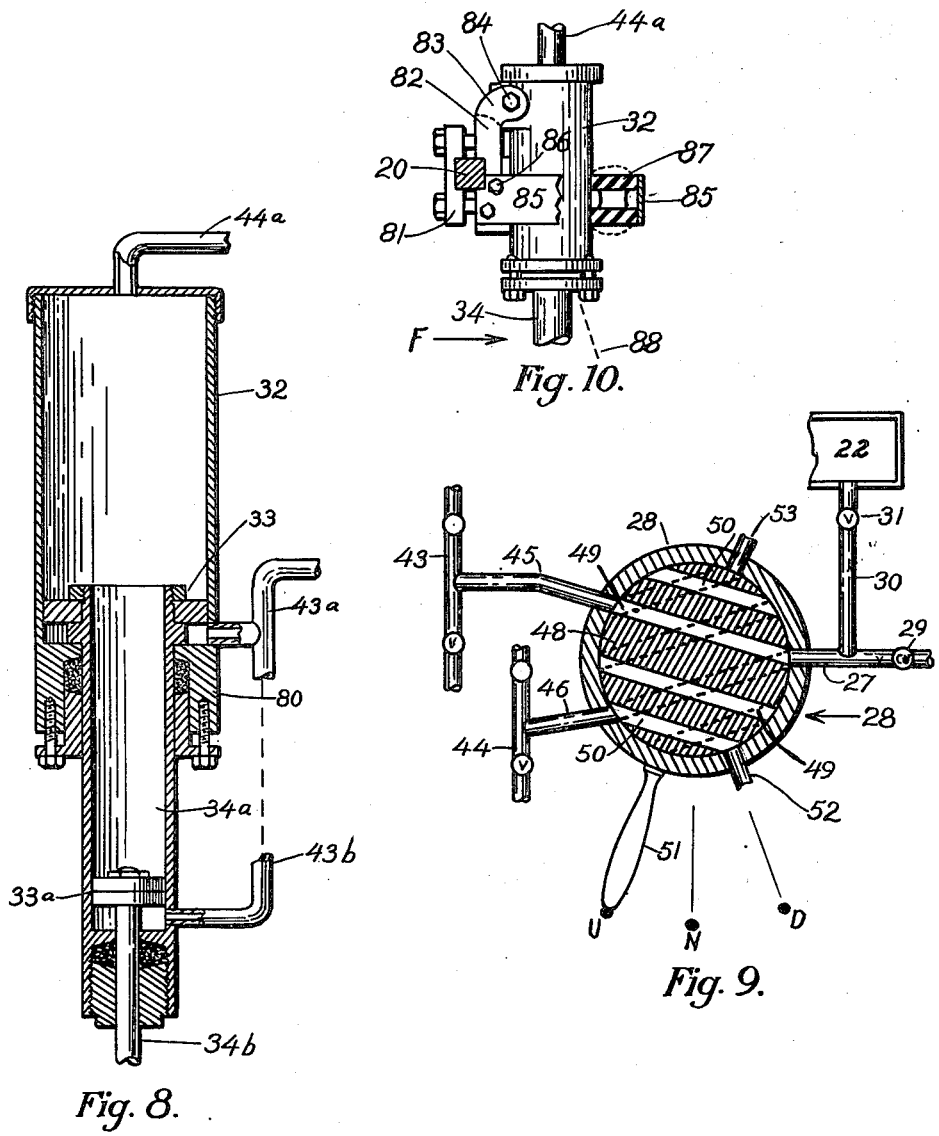
Figure 8 is a diametrical section of a telescoping jack mechanism.
Figure 9 is a section through the control valve, showing the same in one of its operative positions.
Figure 10 shows one example of a shock absorbing mounting.

The rotor is provided with four straight parallel openings extending across the rotor so as to form chords of the circle. The two openings adjacent the center have been designated by reference numeral 49 and the other two openings by reference numeral 50. A handle 51 connects with the rotor and has the operative positions which have been designated by letters U, N and D. Since pipe 27 is connected with a low pressure compartment 23, it is evident that when the valve is in the position shown in Figures 3 and 9, air will flow from chamber 23 into pipes 45, 43 and 43a and that pipes 44 and 46 are connected with the exhaust openings 52 by the openings 50, the air will exhaust at 52 thereby raising the safety wheels to the position shown in Figure 3. If the rotor is now moved so as to bring the handle to the neutral position N the several openings 49 and 50 will be moved out of register with the openings in the valve body, whereupon any air or liquid in the cylinders will be locked therein. This is the neutral position of the valve. If the valve shown in Figure 9 is now rotated counterclockwise to point D the upper opening 49 will connect pipe 27 with pipe 46 and opening 50 at the top in Figure 9 will connect pipe 45 with the outlet pipe 53. Air from the lower pressure chamber will now flow through pipes 46 and 44 to the upper ends of the cylinders, thereby forcing the pistons downwardly and bringing the rubber tires 37 into engagement with the pavement. This position is employed to prevent skidding When ever the operator feels that the car is beginning to skid, he throws the control valve into position D whereupon the auxiliary wheels will be forced against the road and exert a resistance that neutralizes the forces producing skidding of the car. Whenever the wheels are brought downwardly in the manner just described, the wheels on the rear axle will be acted upon by a brake mechanism which has been shown in Figures 6, 7 and 7a and which will now be described.

The brake mechanism to which reference has just been made is shown in Figures 6, 7 and 7a to which reference will now be had. A lever 54 is pivoted to the wheel fork at 55 and carries a brake shoe 56 that is pivoted at its lower end at 57. The upper end of lever 54 is pivoted at 58 to a lever 59 whose other end is pivoted at 60 to the cylinder. The brake shoe has a laterally extending arm 61 to the other end of which rod 62 is connected by means of a pivot 63, the upper end of rod 62 passes through a loop 64 that is mounted in the lever 59 for pivotal movement. The upper end of rod 62 has a head 65. Rod 66 has one end pivoted at 63 and the other end passing through tubular member 67 that is threadedly connected with a pivoted loop 68 as shown in Figure 7a. Tubular member 67 is held in adjusted position by means of a locknut 69.

A spring 70 encloses the rod 66 and is under compression, the amount of compression being regulated by the position of tubular member 67. The function of the spring as part of the brake mechanism that has just been described, is to enable the braking action to be adjusted.

Let us now assume that the parts are in the position shown in Figure 7 and that the control valve is operated to move the auxiliary wheel downwardly, during this movement pivot 55 will move downwardly and carry with it rods 62 and 66. The action of the levers shown are such that when the wheel starts going downwardly, the brake shoe will approach the brake wheel 71 and apply a brake pressure that depends on the compression of spring 70. This braking action will continue until head 65 of rod 62 engages the loop 64, whereupon any further downward movement will compress spring 70 still more and release the brake. The extreme downward extension is only employed when the device is used as a jack or for transporting the car, if one wheel is inoperative, due to a punctured tire or for any other similar reason. It is, of course, unnecessary and undesirable to have the brake acting on the tire 37 when the car is being transported. Since the pistons are acted on at both ends of the cylinder, the end through which the piston rods extend must, of course, be provided with a stuffing box and in Figure 6 such a stuffing box has been shown. The construction of the stuffing box is conventional, the packing material being indicated by reference numeral 72 and the movable gland member by 73. Since there is nothing novel in the construction of the stuffing box, it will not be described in any further detail.

Referring now to Figure 4 it will be seen that the rim 74 terminates at 75 and that the lower point of tire 37 is positioned a distance $d$ below the rim. This distance must be sufficiently great so that if the tire deflates, the weight of the car that is supported by that wheel will be transferred to the auxiliary tire 37 before sufficient pressure can be applied to the deflated tire to injure the same. In most cases the distance $d$ is about two inches.

Although it is desirable in some instances to provide against slow leaks by positioning the auxiliary wheels as shown in Figure 4 and described in the above paragraph, it may be advantageous in other cases to position the auxiliary wheels above line 75 so as to obtain a longer stroke of the pistons. The longer stroke position is indicated for rough unpaved roads.

In case the tire has a blowout of such proportion that the air escapes quite suddenly, the weight will be transferred to the auxiliary wheel very quickly with the result that the momentum will subject the parts to a very severe shock. In order to absorb this momentum, the tire has been provided with a large number of transverse perforations 76 as shown in Figure 7. These perforations allow the tire to act as a spring or a shock absorber that reduces the intensity of the shock when such blowout occurs.

Referring now to Figure 4, it will be observed that a liquid container 77 is connected to pipe 44a. This container has a capacity slightly greater than the maximum volume of the cylinder space above the piston. The pipe that extends from the control valve is connected with the top of the container and that part of pipe 44a that connects with the cylinder communicates with the container at the bottom and therefore whenever fluid pressure is applied to move the piston downwardly, it will force oil or other liquid into the cylinder. The liquid may be a fairly heavy oil that, in addition to giving lubrication, also limits the leakage. It is apparent that if the cylinder is filled with air, the compressibility of this medium will act as a spring and as the capacity is quite large, this spring action will be too great for practical purposes and therefore oil is employed as it is quite incompressible and therefore reduces the spring action. Containers similar to or identical with containers 77 and 78, are connected in pipes 43 and 44 adjacent cylinders 32 and 39 on the opposite side of the car, as shown in Figure 3.

In pipe 43a a liquid container 78 is inserted. This container has a larger capacity than the maximum volume of the cylinder below the piston so that when the piston is in the position shown in Figure 4, the interior of the cylinder, below the piston is filled completely with liquid. It is apparent that if any air were introduced at the bottom of the cylinder, it would immediately move towards the top and displace the oil and gradually transfer all of the oil into the pipes and finally discharge the same through the discharge opening in the control valve.

Pipes 43, 43a, 44 and 44a are each provided with valves 79 which may be ordinary globe valves and whose purpose will presently appear.

In Figure 10 a mounting has been shown which has shock absorbing properties. The cylinder, which, in the illustration is a front axle cylinder 32, is attached to the axle 20 by a clamp comprising parts 81 and 82 that corresponds to the similarly numbered parts in Figure 5. Part 82 has spaced lugs 83 to which the cylinder is attached by pivots 84. A heavy band 85 has its ends attached to the clamp 82 by bolts 86 or other equivalent means. A resilient member 87 is positioned between the cylinder and the closed end of band 85 and is normally under compression. Member 87 may be a rubber tube or a spring; in the drawing it has been shown as a short section of rubber tubing.

When the parts are acted upon by a force F that results when tire 37 hits the pavement while the car is in motion, cylinder 32 and attached parts will pivot about 84 and compress the resilient member 87. Dotted line 88 indicates the position of the axis when the parts have moved in response to force F.

The construction shown in Figure 10 which has also been indicated in a general way, in connection with one of the rear axle cylinders in Figure 3, is intended to illustrate one form of shock absorbing means and may be replaced by any suitable mechanical equivalent.

Operation

Let us now assume that an automotive vehicle is provided with a safety mechanism like that described and shown on the drawings and that compartment 22 of tank T contains air under high pressure and that compartment 23 contains air under a somewhat lower pressure. The pressure in compartment 23 must not be great enough to lift the wheels of the automobile from the pavement when the control valve is thrown to open position to prevent skidding. The pressure in compartment 22 must be so great that when air from this chamber is connected with the top of the cylinders, the force exerted will be sufficient to lift the wheel from the pavement.

Attention has already been called to check valve 20 and to valve 31, also to valve 26. Normally the pressure in compartment 23 is adjusted to the value desired. This may be effected by opening valve 26 manually until the pressure indicated by the pressure gauge is that desired. The pressure in compartment 22 may be as high as the strength of the materials will permit. Instead of having a manually operated valve 26, it is, of course, possible to substitute an automatic pressure reducing valve of any of the well known makes and constructions and when such automatic valves are employed, the pressure in compartment 23 will always remain the same.

Let us now assume that the automobile is traveling over a slippery pavement and that the operator observes that the vehicle starts skidding. In such a case he moves the control valve into the position marked D in Figure 9, whereupon air from chamber 23 will immediately flow to the upper ends of all of the cylinders and move the auxiliary wheels downwardly into contact with the pavement. The downward pressure is, of course, dependent upon the air pressure as above described. As the rear auxiliary wheel moves downwardly, the brake is applied to the brake drum 71 in a manner above explained. The downward pressure of the auxiliary wheels tends to counteract the skidding force and to bring the vehicle under control. After the skidding has been stopped, the control valve is reversed by moving the handle into the position indicated by U in Figures 3 and 9, whereupon the parts are moved upwardly into the position shown in Figures 2 and 3 and into the full line position shown in Figures 4 and 5.

If a blowout or a puncture takes place that deflates the tires and makes it necessary either to change the tires or to transport the vehicle to a repair station; the operator stops the vehicle and closes all of the valves 79 with the exception of the one that controls the flow to the jack connected with the particular wheel that must be raised. He then opens valve 31 in pipe 30, which allows high pressure air to be connected directly to pipe 27. The control valve is now moved into such a position that high pressure air is directed into pipes 44 and 44a whereupon the high pressure air will flow to the particular jack whose valve is open and lift the wheel. After the wheel has been raised as high as necessary, the corresponding valve 79 may be closed, thereby trapping the air and oil and assuring that the jack will remain in extended position. If one of the rear wheels, which is also a drive wheel, is out of commission, it may be anchored to the chassis in such a way that it will not rotate and therefore the vehicle can proceed under its own power, being driven by one of the rear wheels. If it is one of the front wheels that is inoperative, the steering is effected by the other wheel and, since the auxiliary wheel is mounted castor-like, it does not interfere with the steering but allows the vehicle to be guided in the usual manner, and supports that end of the axle. The vehicle can therefore be transported at a slow speed to the nearest repair shop.

When the wheels are adjusted as shown in Figure 4 with the lower peripheral surface of the auxiliary wheels slightly below the lower edge of the rim, then in case a puncture or blowout occurs, the weight of the vehicle, normally supported by the inflated tire, will rest on the auxiliary wheel and the rim will be supported a sufficient distance above the pavement to prevent injury to the tire casing while the vehicle is transported to a place where the tire can be changed. If the auxiliary wheel is adjusted with its lower peripheral surface above the lower periphery of the rim, it will not serve to support the load until the operator has applied the high pressure air to it. Since a big reduction in the air pressure is observed almost immediately, the driver will, of course, stop the vehicle as soon as possible and he can then adjust the valves 79 and 31 so as to put the particular auxiliary wheel into operative position.

In Figure 8, a telescoping cylinder has been illustrated in which the cylinder 32 is held stationary as in the usual construction. The piston rod 34a is made hollow and passes through a stuffing box 80 and its inside forms a cylinder in which there is a piston which has been designated by 33a which controls the plunger or piston rod 34b. It will be apparent that with this construction a double extension can be obtained. The pipe 43a is connected by means of a flexible tube 43b with the lower end of cylinder 34a so that both of the pistons may be moved upwardly whenever pressure is applied through pipe 43. This construction is only applicable to vehicles in which there is sufficient height to permit the telescopic operation to take place and can be used only where very large tires are employed.

One very important safety feature of this device relates to mountain travel and to travel along any road where a wheel is liable to get off from the pavement, as for example, getting outside of the hard surfaced part of the road and onto a soft shoulder. In such cases the weight will be supported on the auxiliary wheel. When pressure is applied to the piston connected therewith the wheel that is off the pavement will be raised permitting it to be brought back onto the pavement. The same can also be done if a wheel falls into a hole in the pavement or into a mud hole. From the above description it will be apparent that the invention is of great utility and serves both as an antiskid device, a jack useful in effecting repairs and as a dolly in transporting the vehicle in the absence of one or more wheels.

Having described the invention what is claimed as new is:

1. A safety device for automotive vehicles having at least one axle supported by wheels, a hydraulic jack cylinder connected with the axle adjacent each wheel, a piston in the cylinder, a piston rod extending through the lower cylinder head, the lower end of the piston rod having a wheel fork, a wheel mounted for rotation in the fork, a source of fluid under pressure, means comprising a control valve for directing fluid from said source into the cylinder on one side of the piston, and for simultaneously connecting the space on the other side with the atmosphere, to move the piston rod and wheel, the control valve having a neutral position in which communication with both sides of the piston is cut off, and means for automatically applying a braking force to the wheel when the piston is moved downwardly.

2. A safety device for automotive vehicles having at least one axle supported by wheels, a hydraulic jack cylinder connected with the axle adjacent each wheel, a piston in the cylinder mounted for free rotary and longitudinal movement, a piston rod extending through the lower cylinder head, the lower end of the piston rod having a rearwardly curved wheel fork, a wheel mounted for rotation in the fork, two sources of fluid of different pressures, means comprising a control valve having an intake port, two delivery ports, and two exhaust ports, for controlling the flow of fluid from the pressure sources and directing fluid from either into the cylinder on either side of the piston and for simultaneously connecting the space on the other side of the piston with the atmosphere, the intake port of the control valve being in direct communication with the low pressure source through a conduit having a check valve opening from the source, and in communication with the high pressure source through a conduit having a manually operable valve, whereby either of the sources of compressed air can be connected with the cylinder, the low pressure source having a value less than that required for lifting the axle and wheel and the high pressure source having a value greater than that required to raise the axle and wheel.

3. A device in accordance with claim 1 in which the brake is provided with a resilient means for regulating the amount of the braking action.

4. A device in accordance with claim 1 in which the brake applying means first applies the brake and then removes it after the wheel has moved downwardly beyond a predetermined limit.

5. A safety device for automotive vehicles having at least one axle supported by wheels, a hydraulic jack cylinder connected with the axle adjacent each wheel, a piston in the cylinder, a piston rod extending through the lower cylinder head, the lower end of the piston rod having a wheel fork, a wheel mounted for rotation in the fork, a source of fluid under pressure, means comprising a control valve for directing fluid under pressure from said source into the cylinder space on one side of the piston and for simultaneously reducing the pressure in the cylinder space on the other side to atmospheric to move the piston rod and wheel, the control valve having a neutral position in which communication with both sides of the piston is cut off, and a resilient abutment positioned between the axle and the cylinder to serve as a shock absorber.

GEORGE J. DOURTE.

REFERENCES CITED

The following references are of record in the file of this patent:

UNITED STATES PATENTS

| Number | Name | Date |
|---|---|---|
| 1,103,036 | Clark | July 14, 1914 |
| 1,130,884 | Blaken et al. | Mar. 9, 1915 |
| 1,491,097 | Hoffman | Dec. 26, 1922 |
| 2,002,132 | Wolfe | May 21, 1935 |
| 2,237,167 | Skavinsky | Apr. 1, 1941 |